United States Patent [19]

Leconte

[11] Patent Number: 4,568,529

[45] Date of Patent: Feb. 4, 1986

[54] THERMOPLASTIC COMPOSITE MATERIAL FOR THE PREPARATION OF MOULDED OBJECTS, PARTICULARLY BY INJECTION, AND A PROCESS FOR MAKING SAME

[75] Inventor: Christian Leconte, Saint Raphael, France

[73] Assignee: Thermo-Formage Mediterraneen, Frejus, France

[21] Appl. No.: 652,852

[22] Filed: Sep. 21, 1984

[51] Int. Cl.$^4$ .................................................. B32B 5/16
[52] U.S. Cl. ..................... 428/325; 427/221; 428/406; 428/441; 524/494; 524/503; 525/57
[58] Field of Search ............... 524/494, 503; 525/57; 428/325, 406, 441

[56] References Cited

U.S. PATENT DOCUMENTS 4,254,019 3/1981 Kreyer .................................. 524/494
4,353,951 10/1982 Yukitoshi et al. .................... 428/325

FOREIGN PATENT DOCUMENTS 5031582 12/1970 Japan .................................... 524/494
8196250A 5/1982 Japan .................................... 524/494

Primary Examiner—Jacob Ziegler
Attorney, Agent, or Firm—Fisher, Christen & Sabol

[57] ABSTRACT

The invention relates to a thermoplastic composite material for the preparation of moulded objects, particularly of injection-moulded objects, and to a process for making same. The material according to the invention has the following composition by weight:

| polypropylene preferably | between 50 and 60% and 55% |
|---|---|
| glass spheres preferably | from 5 to 15% and 11% |
| polyvinylic alcohol preferably | from 25 to 40% and 33% |

The invention is more particularly applicable to making moulded objects such as containers or medical syringes adapted to be subjected to sterilization.

7 Claims, No Drawings

THERMOPLASTIC COMPOSITE MATERIAL FOR THE PREPARATION OF MOULDED OBJECTS, PARTICULARLY BY INJECTION, AND A PROCESS FOR MAKING SAME

The present invention relates to a composition of composite material presenting thermoplastic characteristics allowing objects to be manufactured by moulding, the material being taken by thermal effect to a malleable physical state allowing it to be formed in the desired shapes and by using the techniques of thermoforming, injection, extrusion blow moulding and in general the techniques of forming thermoplastic materials to take them to the appropriate shape.

Various compositions based on polymerized materials presenting thermoplastic properties and in the form of granules are known; these granules may be placed in an extruder incorporating an Archimedian screw which, when rotated and accompanied by a rise in temperature of the material, takes the latter to the appropriate physical state allowing, either by extrusion or by injection in a mould, the shaping of successive doses of materials which, on cooling, lead to objects of the desired dimensions and shapes.

The materials used for their thermoplastic properties each present specific advantages and drawbacks.

The present invention envisages a synergetic composition presenting remarkable novel characteristics for making various objects of complex shapes, particularly objects made by injection and comprising a surface of small thickness, whose shape enables them to perform the role of containers for appropriate uses.

The material according to the invention presents overall characteristics and the sum of a certain number of features which, up to the present time, could not be combined or made with the desired efficiency.

According to a first feature, the invention relates to a composite materials with thermoplastic characteristics adapted to manufacture various objects by moulding and this material is characterized by the following composition expressed in percentage by weight:

| | |
|---|---|
| polypropylene | 40 to 80% |
| glass spheres | 5 to 40% |
| polyvinylic alcohol (EVAL) | 5 to 60% |

More especially and advantageously, the composite material according to the invention has the following composition by weight:

| | |
|---|---|
| polypropylene preferably | between 50 and 60% and 55% |
| glass spheres preferably | from 5 to 15% and 11% |
| polyvinylic alcohol preferably | from 25 to 40% and 33% |

According to a more particular feature, the glass spheres used in the composition of the composite material of the invention present a granulometry of micrometric nature.

More especially, the glass spheres have a granulometric dimension of between 1 and 10 microns.

The invention also relates to a process for preparing the composite material hereinabove, characterized by the steps of forming a mixture of 40 to 80% polypropylene and 20 to 40% glass spheres with a granulometry of between 1 and 10 microns, and treating this mixture in an extruder of known type and extruding it in the form of granules of a polypropylene/glass sphere mixture, these granules being in turn remixed with granules of pure polypropylene and granules of polyvinylic alcohol in the percentages indicated hereinabove.

Within the scope of the above process, the granules of polypropylene/glass sphere mixture are preferably prepared from a proportion by weight of two parts of polypropylene and of one part of glass spheres.

The invention also relates to a complex material with thermoplastic properties for the preparation of objects obtained by moulding and corresponding to the following definition:

one third granules of pure polypropylene one third granules of a mixture comprising 66% polypropylene and 33% glass spheres with a granulometry of between 1 and 10 microns one third granules of polyvinylic alcohol.

The invention also relates to a process for preparing moulded objects, characterized in that the object is injection-moulded from a composite material corresponding to the above characteristics.

Finally, the invention relates to the injection-moulded objects obtained from the material with the characteristics defined hereinabove.

The material used within the scope of the present invention exhibits a high thermal inertia which allows it in particular good resistance under extreme temperature conditions going up to 160° C.

These properties are allied in novel manner with physical characteristics of tightness to gas and in particular to steam.

Under these conditions, the material according to the invention may advantageously be used for making containers intended to be subjected to severe heat conditions, for example containers allowing heat treatments for pasteurization, even sterilization.

These properties come from the synergetic mixture of the characteristics of the different elements intervening in the novel combination which, furthermore, presents a remarkable physical homogeneity enabling it to ensure a good physical resistance to shocks.

The products obtained by using the material according to the invention may thus be made by the conventional techniques for shaping thermoplastic materials, in particular in injection machines employing moulds of appropriate shapes and under the conditions identical to those used for the conventional thermoplastic materials.

Thanks to the use of current techniques, mass-produced products of low cost price are thus obtained.

As the composite material is homogeneous, it may be recycled within the phase of manufacture with recovery of the waste, which enables the manufacturing costs and consequently the cost price to be reduced.

The homogeneity of the product also enables it to avoid the problems associated with the bonding of co-extruded elements for example in the form of complex foils.

The material used within the scope of the invention may also be decorated by conventional techniques, inter alia by surface printing after cooling or by overmoulding during the injection of a pre-printed decoration.

The material according to the invention, thanks to its novel, original properties of resistance to temperatures, therefore makes it possible to produce packings and containers compatible with foods and adapted to contain preserves or semi-preserved products.

The product can in fact be kept for at least a year.

The containers made from the material according to the invention may be closed by lids made of a material identical to that of the container, in accordance with current techniques, or may be closed by an aluminium foil provided on one face with a laquer suitably chosen for its compatibility with the material of the invention in order to enable said aluminium foil to be sealed on the edges of the container, whilst ensuring good peelability.

In the medical field, the invention will also be advantageously used for making syringes to replace glass syringes which must be sterilized, or which are pre-filled with a drug and most therefore be gas-tight.

An embodiment of the invention for making a sterilizable syringe, adapted also to be pre-filled, has been described hereinafter.

A first set of granules of mixture or compound was firstly prepared from 30% by weight glass spheres, with a granulometry of between 2 and 5 mircons and 70% by weight of granules of polypropylene. This mixture was introduced into an extruder and was extruded in the form of rings then cut transversely by conventional techniques, to obtain granules of a compound whose composition corresponds to the composition of the initial mixture, namely 30% glass spheres and 70% polypropylene.

These granules of mixture were used to make the final composition under the following conditions.

One part of granules of the previous mixture, one part of granules of pure polypropylene and one part of granules of polyvinylic alcohol were used.

After homogenization, the three parts were introduced into an injection machine of known type adapted to inject into a mould of appropriate shape the thermoplastic composite material previously defined.

By using an injection machine and an appropriate, conventional mould, syinges presenting remarkable properties for use are thus obtained.

The syringes are unbreakable whilst presenting the necessary rigidity and mechanical strength.

These syringes, mass-produced in large quantities, may be of particularly advantageous, low cost price.

More especially, as the syringes thus produced can withstand a temperature of more than 140° C., they may therefore be subjected to sterilization in boiling water and present good tightness to oxygen.

Recipients and containers of dimensions varying between some centiliters and one liter or more and adapted to contain food products which can be kept for several months, may be produced under the same conditions.

The tests and experiments run by Applicants have verified the characteristics of the product thus produced as far as its resistance to sterilization, its permeability to oxygen and its behaviour under severe temperature conditions are concerned.

A batch of cylindrical containers made of injected plastics material from the material according to the invention was subjected to tests to establish resistance to sterilization.

This test was run as follows:

a—temperature 130°±1° C. without humidity duration: 3 hrs.

b—temperature 125° C.±1° C. in saturated water vapour duration: 3 hrs.

Possible deformations were observed by measuring different dimensions before and after sterilization (measured by a 5/100 sliding caliper). Test made on two containers per type of test.

Measurements were taken per container on the sides at two perpendicular diameters, respectively:
upper outside to outside diameter
outside diameter of the bottom
outside to outside height.

The result of the measurements is shown in Tables 1 and 2 hereinafter.

Tests of permeability to oxygen were also run, using test pieces in the form of boats made of thermoplastic material according to the characteristics of the invention.

An OXTRAN 100 apparatus was used to measure the permeability of the recipients, in accordance with the following method:

The recipient is glued on a metal plate with the aid of an epoxide resin. This metal plate is connected to the apparatus by two tubes. The latter allow the interior of the recipient to be scavenged by a vector gas (nitrogen) and the apparatus measures the pollution of the vector gas by the oxygen of the outside air having migrated through the body of the recipient.

The particular conditions of the test were as follows:
Test in ambient air: 21% oxygen
Temperature: 20° C.
Number of samples tested:
   3 boats according to the invention
   3 control boats
The results are as follows:
boats of the invention
   1—of the order of 0.001
   2—of the order of 0.002
   2—0.020
control boats
   1—0.030
   2—0.030
   3—0.032

Finally, the inertia of a container made from the material according to the invention and having to come into contact with food was examined in order to study the behaviour of said container under severe heat conditions.

The test was run for 1 hour at 100° C. in distilled water and sunflower oil, respectively, and it demonstrated the inertia of the recipients for receiving food poured hot, as well as for undergoing the thermic phases assocated with pasteurization or sterilization of the food.

The tests led to the following observations:

| Tests: 1 hour at 100° C. in: | distilled water | sunflower oil |
|---|---|---|
| Observations on the test pieces | No apparent modification | |
| Observations on the medium | Limpid, without taste nor odour | |
| Overall migration in mg/dm² | 0.9 | 9.6 |

TABLE N° 1

| Test | | | Before | After |
|---|---|---|---|---|
| 130° C. dry | Container | 1 ∅ (upper) | 91.0 mm | 90.3 mm |
| | | | 91.1 | 90.0 |
| | | ∅ (lower) | 84.3 | 83.3 |
| | | | 84.2 | 83.2 |

TABLE N° 1-continued

| Test | | | Before | After |
|---|---|---|---|---|
| | | h | 39.11 | 38.85 |
| | | | 39.0 | 38.7 |
| Container | 2 ∅ (upper) | | 91.0 | 90.0 |
| | | | 91.1 | 90.3 |
| | ∅ (lower) | | 84 | 83.65 |
| | | | 84.3 | 83.7 |
| | h | | 39 | 38.7 |
| | | | 39 | 38.7 |

TABLE N° 2

| Test | | | | Before | After |
|---|---|---|---|---|---|
| 125° C. wet | Container | 1 ∅ (upper) | | 90.4 | 89.5 |
| | | | | 91.0 | 89.4 |
| | | ∅ (lower) | | 84.3 | 83.4 |
| | | | | 83.8 | 83.1 |
| | | h | | 39.0 | 38.65 |
| | | | | 39.0 | 38.6 |
| | container | 2 ∅ (upper) | | 90.9 | 90.6 |
| | | | | 90.8 | 89.1 |
| | | ∅ (lower) | | 84.0 | 83.5 |
| | | | | 84.2 | 83.5 |
| | | h | | 38.9 | 38.5 |
| | | | | 39.0 | 38.8 |

What is claimed is:

1. A composite material with thermoplastic characteristics adapted to manufacture various objects by moulding, characterized by the following composition expressed in percentage by weight:

| polypropylene | 40 to 80% |
|---|---|
| glass spheres | 5 to 40% |
| polyvinyl alcohol | 5 to 60% |

2. The composite material of claim 1, wherein it has the following composition by weight:

| polypropylene | between 50 and 60% |
|---|---|
| glass spheres | from 5 to 15% |
| polyvinylic alcohol | from 25 to 40% |

3. The composite material of claim 1, wherein the glass spheres used in its composition present a granulometry of micrometric nature.

4. The composition material of claim 3, wherein the glass spheres have a granulometric dimension of between 1 and 10 microns.

5. A complex material with thermoplastic properties in accordance with claim 1, and adapted for the preparation of objects obtained by moulding, characterized by the following composition:
   one third granules of polypropylene
   one third granules of a mixture comprising 66% polypropylene and 33% glass spheres with a granulometry of between 1 and 10 microns
   one third granules of polyvinylic alcohol.

6. A process for preparing moulded objects, wherein the object is injection-moulded from a composite material corresponding to the characteristics defined in claim 1.

7. Injection-moulded objects obtained from the material of claim 1.

* * * * *